United States Patent
Yu

(10) Patent No.: US 9,070,948 B2
(45) Date of Patent: Jun. 30, 2015

(54) LITHIUM SECONDARY BATTERY

(75) Inventor: Sung-Hoon Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 584 days.

(21) Appl. No.: 12/944,930

(22) Filed: Nov. 12, 2010

(65) Prior Publication Data

US 2011/0064988 A1  Mar. 17, 2011

Related U.S. Application Data

(63) Continuation of application No. PCT/KR2010/005235, filed on Aug. 10, 2010.

(30) Foreign Application Priority Data

| Aug. 10, 2009 | (KR) | 10-2009-0073369 |
| Aug. 10, 2009 | (KR) | 10-2009-0073374 |
| Aug. 10, 2010 | (KR) | 10-2010-0076689 |

(51) Int. Cl.
*H01M 2/16* (2006.01)
*H01M 10/0569* (2010.01)
(Continued)

(52) U.S. Cl.
CPC .......... *H01M 10/0525* (2013.01); *H01M 2/145* (2013.01); *H01M 2/166* (2013.01); *H01M 2/1686* (2013.01); *H01M 2/18* (2013.01);
(Continued)

(58) Field of Classification Search
CPC .. H01M 2/16; H01M 2/1686; H01M 10/0569
USPC .......... 429/144, 145, 324, 337, 338, 347, 251
See application file for complete search history.

(56) References Cited

U.S. PATENT DOCUMENTS 6,589,690 B1  7/2003  Sato et al.
6,632,561 B1  10/2003 Bauer et al.
(Continued)

FOREIGN PATENT DOCUMENTS

CN  1253590 A  5/2000
CN  1969407 A  5/2007
(Continued)

OTHER PUBLICATIONS

Ethylene Carbonate Fact Sheet. New Japan Chemical Co., Ltd. Internet printout. (no date).*

*Primary Examiner* — Tracy Dove
(74) *Attorney, Agent, or Firm* — Birch, Stewart, Kolasch & Birch, LLP

(57) ABSTRACT

A lithium secondary battery includes a cathode, an anode, a separator interposed between the cathode and the anode, and a non-aqueous electrolytic solution obtained by dissolving lithium salt to a non-aqueous solvent. The separator includes a porous substrate having pores; and a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles. The non-aqueous solvent is a high-viscous non-aqueous solvent having a viscosity of 1.4 cP or above at 25° C. This lithium secondary battery gives improved safety and excellent charging/discharging characteristics since it has the high-viscous non-aqueous solvent and the separator with good wettability against the solvent.

14 Claims, 4 Drawing Sheets

(51) Int. Cl.
H01M 10/0525 (2010.01)
H01M 2/14 (2006.01)
H01M 2/18 (2006.01)
H01M 4/505 (2010.01)
H01M 4/525 (2010.01)

(52) U.S. Cl.
CPC ............... *H01M4/505* (2013.01); *H01M 4/525* (2013.01); *H01M 10/0569* (2013.01); *Y02E 60/122* (2013.01)

(56) References Cited

U.S. PATENT DOCUMENTS

| | | | |
|---|---|---|---|
| 7,662,517 | B2 | 2/2010 | Lee et al. |
| 7,704,641 | B2 | 4/2010 | Yong et al. |
| 7,883,799 | B2 * | 2/2011 | Seo et al. ............ 429/251 |
| 2003/0118913 | A1 | 6/2003 | Takami et al. |
| 2005/0031963 | A1 | 2/2005 | Im et al. |
| 2006/0008700 | A1 | 1/2006 | Yong et al. |
| 2007/0009806 | A1 | 1/2007 | Kim |
| 2007/0042266 | A1 | 2/2007 | Oh et al. |
| 2007/0099072 | A1 | 5/2007 | Hennige et al. |
| 2007/0122716 | A1 * | 5/2007 | Seo et al. ............ 429/251 |
| 2008/0044733 | A1 * | 2/2008 | Ohata et al. ............ 429/326 |
| 2008/0118845 | A1 | 5/2008 | Ihara et al. |
| 2008/0138700 | A1 | 6/2008 | Horpel et al. |
| 2008/0193853 | A1 | 8/2008 | Kim et al. |
| 2010/0068613 | A1 | 3/2010 | Deguchi |
| 2010/0167124 | A1 | 7/2010 | Seo et al. |
| 2010/0285341 | A1 | 11/2010 | Yun et al. |
| 2010/0291430 | A1 | 11/2010 | Lee et al. |
| 2010/0304225 | A1 | 12/2010 | Pascaly et al. |
| 2012/0177956 | A1 | 7/2012 | Im et al. |

FOREIGN PATENT DOCUMENTS

| | | |
|---|---|---|
| EP | 2 023 434 A1 | 2/2009 |
| JP | 2002-529891 A | 9/2002 |
| JP | 2007-504628 A | 3/2007 |
| JP | 2008-503049 A | 1/2008 |
| JP | 2008-524824 A | 7/2008 |
| JP | 2009-508148 A | 2/2009 |
| JP | 2009-135076 A | 6/2009 |
| KR | 10-2000-0076975 A | 12/2000 |
| KR | 10-2006-0021222 A | 3/2006 |
| KR | 10-2006-0104164 A | 10/2006 |
| KR | 10-2007-0006253 A | 1/2007 |
| KR | 10-2007-0019958 A | 2/2007 |
| KR | 10-0775295 B1 | 11/2007 |
| KR | 10-2008-0010166 A | 1/2008 |
| KR | 10-2008-0046562 A | 5/2008 |
| KR | 10-2009-0037552 A | 4/2009 |
| KR | 10-2009-0051546 A | 5/2009 |

\* cited by examiner

LITHIUM SECONDARY BATTERY

CROSS-REFERENCE TO RELATED APPLICATION

This application is a continuation of International Application No. PCT/KR2010/005235 filed on Aug. 10, 2010, which claims priority under 35 USC 119(a) to Korean Patent Application No. 10-2009-0073369 filed in Republic of Korea on Aug. 10, 2009, Korean Patent Application No. 10-2009-0073374 filed in Republic of Korea on Aug. 10, 2009, and Korean Patent Application No. 10-2010-0076689 filed in Republic of Korea on Aug. 10, 2010, the entire contents of which are incorporated herein by reference.

TECHNICAL FIELD

The present invention relates to a lithium secondary battery, and more particularly to a lithium secondary battery having a non-aqueous electrolytic solution with a stable high-viscous non-aqueous solvent.

BACKGROUND ART

Recently, interests on energy storage technologies are more increased. As the energy storage technologies are extended to cellular phones, camcorders and notebook PC, and further to electric vehicles, the demand for high-energy concentration of a battery used as a power source of such an electronic device is increased. A lithium ion secondary battery is one of the most satisfactory batteries, and many studies are now in active progress.

A lithium secondary battery developed in the early 1990's includes an anode made of carbon material capable of intercalating or disintercalating lithium ions, a cathode made of lithium-containing oxide, a separator interposed between the anode and the cathode, and a non-aqueous electrolyte solution obtained by dissolving a suitable amount of lithium salt in a non-aqueous solvent.

The non-aqueous solvent of lithium secondary batteries may use a mixed solvent with polarity in which a cyclic carbonate compound such as ethylene carbonate or propylene carbonate and a linear carbonate compound such as dimethyl carbonate, ethylmethyl carbonate or diethyl carbonate are suitably mixed. Here, the non-aqueous solvent is controlled to have a low viscosity so as to show good wettability against the separator.

In other words, a lithium secondary battery can be charged or discharged only when the separator is sufficiently wet by the non-aqueous solvent. However, non-aqueous solvents commonly used have a different polarity from common separators such as polyolefin-based porous films or polyester-based non-woven fabrics, so it is needed to improve wettability of the non-aqueous solvent against the separator. If the wettability of the non-aqueous solvent against the separator is deteriorated, charging or discharging of the lithium secondary battery becomes deteriorated or disabled. Accordingly, the wettability of a non-aqueous solvent against a separator is kept over a certain level by using a non-aqueous solvent with a low viscosity or adding a low-viscous organic solvent over a certain amount to lower the viscosity. In common cases, a non-aqueous solvent has a viscosity equal to or slightly more than 1.0 cP at 25° C.

However, using a non-aqueous solvent with a low viscosity may cause water leak, and such a non-aqueous solvent tends to be easily evaporated due to its strong volatile property. In addition, due to strong flammability of the non-aqueous solvent with a low viscosity, safety-related problems such as firing or explosion caused by overcharging, thermal runaway or piercing of the separator become worse. In these days when explosion accidents of lithium secondary batteries come to social issues, such safety-related problems are considered more seriously.

Thus, there is still a strong demand of using a non-aqueous solvent having a high viscosity (commonly a viscosity of 1.4 cP or above at 25° C.) with a high flashing point. However, if a non-aqueous electrolytic solution containing a non-aqueous solvent with a high viscosity of 1.4 cP or above at 25° C. is applied to common separators such as polyolefin-based porous films or non-woven fabrics, the wettability against the separator becomes poor, so the charging or discharging performance of the lithium secondary battery is greatly deteriorated or disabled.

To solve this problem, there have been proposed many methods, such as adding a surfactant or applying heat or pressure when a non-aqueous electrolytic solution is injected, but these methods need additional processes and thus they are not economical.

Meanwhile, Korean laid-open patent publication No. 2007-0019958 discloses a separator having a porous coating layer formed by coating at least one surface of a porous substrate having a plurality of pores with a mixture of inorganic particles and a binder polymer. A separator of such a structure prevents a short between the anode and the cathode when the porous film is thermally shrunken or the separator is pierced, thereby enhancing safety of the lithium secondary battery. However, though a lithium secondary battery has such a separator, the above problems caused by a low-viscous non-aqueous solvent are still not solved.

DISCLOSURE

Technical Problem

The present invention is designed to solve the problems of the prior art, and therefore the present invention is directed to providing a lithium secondary battery having an improved safety and excellent charging/discharging characteristics by using a high-viscous non-aqueous solvent.

Technical Solution

In one aspect of the present invention, there is provided a lithium secondary battery, which includes a cathode, an anode, a separator interposed between the cathode and the anode, and a non-aqueous electrolytic solution obtained by dissolving lithium salt to a non-aqueous solvent, wherein the separator includes: a porous substrate having pores; and a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles, wherein the non-aqueous solvent is a high-viscous non-aqueous solvent having a viscosity of 1.4 cP or above at 25° C.

In the lithium secondary battery according to the present invention, the porous substrate may use a polyolefin-based porous film, for example polyethylene, polypropylene, polybutylene and polypentene in single or in mixture. Also, the porous substrate may use a non-woven fabric made of polyester, polyacetal, polyamide, polycarbonate, polyimide, polyetheretherketone, polyethersulfone, polyphenylene oxide, polyphenylene sulfide and polyethylene naphthalene in single or in mixture.

In the lithium secondary battery according to the present invention, the inorganic particles of the porous coating layer preferably have an average diameter of 0.001 to 10 µm. Here, the inorganic particles may use inorganic particles having a dielectric constant of 5 or above and inorganic particles having lithium ion transferring capability in single or in mixture.

In the lithium secondary battery according to the present invention, the binder polymer preferably has a solubility parameter of 15 to 45 $Mpa^{1/2}$, for example polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and so on.

In the lithium secondary battery according to the present invention, the high-viscous non-aqueous solvent preferably has a viscosity of 2.0 cP or above at 25° C., and the high-viscous non-aqueous solvent may include γ-butyrolactone, fluoroethylene carbonate or their mixtures. In particular, the high-viscous non-aqueous solvent preferably includes ionic liquid, for example imidazole-based ionic liquid, ammonium-based ionic liquid, pyrolidium-based ionic liquid, pyridinium-based ionic liquid and phosphonium-based ionic liquid, which may be used in single or in mixture.

Advantageous Effects

According to the present invention, the porous coating layer formed with inorganic particles and a binder polymer improves wettability of the high-viscous non-aqueous solvent against the separator. Accordingly, the high-viscous non-aqueous solvent becomes useable, and also the amount of low-viscous solvent that is mixed with the non-aqueous solvent can be decreased. Thus, it is possible to make a lithium secondary battery with improved safety and excellent charging/discharging characteristics.

DESCRIPTION OF DRAWINGS

Other objects and aspects of the present invention will become apparent from the following description of embodiments with reference to the accompanying drawing in which.

BEST MODE

Figure 1:
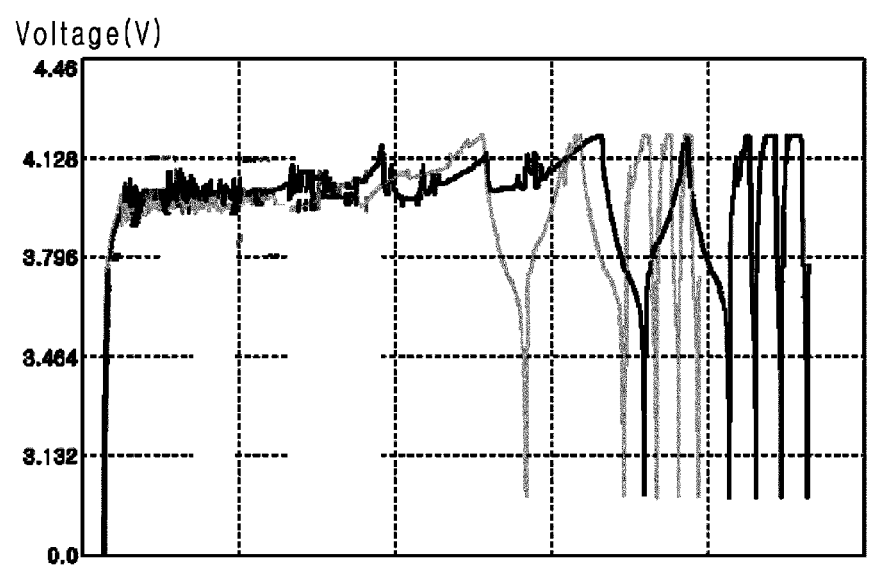
FIG. 1 is a graph showing charging/discharging results for a coin cell according to a comparative example 1.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A lithium secondary battery of the present invention includes a cathode, an anode, a separator interposed between the cathode and the anode, and a non-aqueous electrolytic solution obtained by dissolving lithium salt to a non-aqueous solvent.

The separator includes a porous substrate having pores, and a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles.

The non-aqueous solvent is a high-viscous non-aqueous solvent having a viscosity of 1.4 cP or above at 25° C.

The inventors found that a high-viscous non-aqueous solvent can be used since the separator including a porous coating layer as configured above improves wettability of the non-aqueous solvent against the separator, and then completed this invention. Accordingly, it is possible to apply a high-viscous non-aqueous solvent to lithium secondary batteries and thus reduce the amount of low-viscous solvent to be mixed with the non-aqueous solvent, so a lithium secondary battery may have improved stability and keep excellent charging/discharging characteristics.

(a) Separator

In the present invention, the separator includes a porous substrate having pores, and a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles.

The porous substrate having pores may use a porous film or a porous non-woven fabric commonly used as a separator of a lithium secondary battery. The porous film may be a polyolefin-based porous film, for example polyethylene, polypropylene, polybutylene and polypentene, which may be used in single or in mixture. Also, the non-woven fabric may use polyester, polyacetal, polyamide, polycarbonate, polyimide, polyetheretherketone, polyethersulfone, polyphenylene oxide, polyphenylene sulfide and polyethylene naphthalene, which may be used in single or in mixture, besides the above polyolefin-based non-woven fabrics.

The porous substrate preferably has a thickness of 1 to 100 µm, though not limited thereto. Size and porosity of the pores existing in the porous substrate are also not specially limited, but preferably 0.01 to 50 µm and 10 to 95%, respectively.

A porous coating layer is formed on at least one surface of the porous substrate. The porous coating layer includes a plurality of inorganic particles and a binder polymer. The inorganic particles are connected and fixed to each other by means of the binder polymer, and pores of the porous coating layer are formed by interstitial volumes among the inorganic particles. The porous coating layer of such a structure may be easily formed by adjusting contents of inorganic particles and binder polymer and controlling process conditions. The inorganic particles of the porous coating layer have good affinity with respect to non-aqueous solvents. Thus, a high-viscous solvent easily permeates the porous coating layer through the pores formed by interstitial volumes among the inorganic particles. In other words, the porous coating layer plays a role of improving wettability of the high-viscous solvent against the separator.

The inorganic particle used for forming the porous coating layer is not specially limited if it is electrochemically stable. In other words, inorganic particles available in the present invention are not limited if they do not cause oxidation or reduction reaction in an operating voltage range (for example, 0 to 5V based on Li/Li$^+$) of a lithium secondary battery to which the present invention is applied. In particular, in case an inorganic particle with a high dielectric constant is used, it contributes to the increase of dissociation of electrolyte salt, for example lithium salt, in the liquid electrolyte, thereby improving ion conductivity of the electrolytic solution.

Due to the above reasons, it is preferred that the inorganic particles include inorganic particles having a dielectric constant of 5 or above, preferably 10 or above.

The inorganic particle having a dielectric constant of 5 or above may be for example $BaTiO_3$, $Pb(Zr,Ti)O_3$ (PZT), $Pb_{1-x}La_xZr_{1-y}Ti_yO_3$ (PLZT, here $0<x<1$, $0<y<1$), $PB(Mg_3Nb_{2/3})O_3-PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or their mixtures, but not limitedly.

Also, the inorganic particles may use inorganic particles having lithium ion transferring capability, or inorganic particles having a function of moving a lithium ion without storing lithium. The inorganic particle having lithium ion transferring capability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4-Li_2S-SiS_2$, $P_2S_5$-based glass ($Li_xP_yS_z$, $0<x<3$, $0<y<3$, $0<z<7$) such as $LiI-Li_2S-P_2S_5$, or their mixtures, but not limitedly.

The size of inorganic particles is not specially limited, but it preferably ranges from 0.001 to 10 μm in order to form a coating layer with a uniform thickness and ensure suitable porosity. If the particle size is less than 0.001 μm, a dispersing property of inorganic particles may be deteriorated. If the particle size exceeds 10 μm, the thickness of the porous coating layer is increased.

Also, the binder polymer used for forming the porous coating layer preferably may be a polymer having a glass transition temperature ($T_g$) ranging from −200 to 200° C., since this polymer may improve mechanical properties such as flexibility and elasticity of the finally formed porous coating layer. This binder polymer sufficiently plays a role of binder for connection and stable fixation among inorganic particles or between inorganic particles and the porous substrate. The binder polymer may use any polymer commonly used in the art for forming a porous coating layer on the porous substrate, and here the binder polymer uses a polymer with more excellent thermal resistance than the porous substrate.

The ion transferring capability is not essential to the binder polymer, but a polymer having ion transferring capability may further improve the performance of a lithium secondary battery. Thus, the binder polymer preferably has as high dielectric constant as possible. In fact, a solubility parameter of salt in an electrolytic solution depends on a dielectric constant of an electrolyte solvent, so a polymer with a higher dielectric constant may improve the degree of salt dissociation further. Such a binder polymer preferably has a dielectric constant ranging from 1.0 to 100 (a measurement frequency is 1 kHz), particularly 10 or above.

In addition to the above functions, the binder polymer may exhibit a high degree of swelling as it gelates when being swelled in a liquid electrolytic solution. Accordingly, a polymer having a solubility parameter ranging from 15 to 45 $Mpa^{1/2}$ is preferred, and the solubility parameter more preferably ranges from 15 to 25 $Mpa^{1/2}$ and 30 to 45 $Mpa^{1/2}$. Thus, hydrophilic polymer having many polar groups is preferred rather than hydrophobic polymer such as polyolefin. If the solubility parameter is less than 15 $Mpa^{1/2}$ or greater than 45 $Mpa^{1/2}$, the polymer may not be easily swelled in a common liquid electrolyte for batteries.

Such polymer may be polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate copolymer, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and so on, but not limitedly.

A ratio of the inorganic particles to the binder polymer in the porous coating layer formed on the porous substrate according to the present invention is preferably 50:50 to 99:1, more preferably 70:30 to 95:5. If the ratio of the inorganic particles to the binder polymer is less than 50:50, the content of polymer is so great that pore size and porosity of the porous coating layer may be decreased. If the content of inorganic particles exceeds 99 parts by weight, the peeling resistance of the porous coating layer may be weakened since the content of binder polymer is so small. Pore size and porosity of the porous coating layer are not specially limited, but the pore size is preferably 0.001 to 10 μm and the porosity is preferably 10 to 90%. The pore size and porosity are mainly dependent on the size of inorganic particles. For example, in case inorganic particles have a diameter of 1 μm or less, the formed pore is also approximately 1 μm or less. The pores as mentioned above are filled with a non-aqueous electrolytic solution injected later, and the filled non-aqueous electrolytic solution plays a role of transferring ions. In case the pore size and porosity are respectively less than 0.001 μm and 10%, the porous coating layer may act as a resistance layer. In case the pore size and porosity are respectively greater than 10 μm and 90%, mechanical properties may be deteriorated.

The separator of the present invention may further include other additives without deteriorating the aim of the present invention, in addition to the inorganic particles and the binder polymer, mentioned above, as components of the porous coating layer. The porous coating layer preferably has a thickness of 0.01 to 20 μm.

The separator mentioned above may be made by coating a porous substrate with the binder polymer solution in which inorganic particles are dispersed. Various common coating methods well known in the art may be used, for example dip coating, die coating, roll coating, comma coating or their combinations.

The separator prepared as mentioned above according to the present invention is interposed between a cathode and an anode. At this time, in case a polymer that is gellable at swelling in liquid electrolyte is used as a binder polymer component, after a battery is assembled, the injected electrolytic solution and the binder polymer may be reacted and then gelated.

(b) Non-Aqueous Electrolytic Solution

In the lithium secondary battery of the present invention, a high-viscous non-aqueous solvent having a viscosity of 1.4 cP or above at 25° C. is used as the non-aqueous solvent. The non-aqueous solvent having such a viscosity may have one kind of non-aqueous solvent or may be a mixed solvent in which at least two kinds of non-aqueous solvents are mixed. Preferably, the non-aqueous solvent has a viscosity of 2.0 cP or above at 25° C. Such a high-viscous non-aqueous solvent may be γ-butyrolactone or fluoroethylene carbonate, but the present invention is not limited thereto since any high-viscous solvent contributing to thermal stability of the battery may be used.

In particular, an ionic liquid is preferably included as the high-viscous solvent. For example, so-called ionic liquids such as imidazole-based ionic liquid and ammonium-based ionic liquid have high viscosity, but they are not easily burnt or volatilized and exhibit relatively high ion conductivity. The ionic liquid may use any kind of ionic liquid capable of contributing to thermal stability of the lithium secondary battery, for example imidazole-based ionic liquid, ammonium-based ionic liquid, pyrolidium-based ionic liquid, pyridinium-based ionic liquid and phosphonium-based ionic liquid, which may be used in single or in mixture.

The high-viscous non-aqueous solvent of the present invention may be mixed with non-aqueous solvents commonly used in the art, for example a low-viscous non-aqueous solvent such as dimethyl carbonate or other kinds of non-aqueous solvents such as cyclic carbonate, if the entire non-aqueous solvent has a viscosity of 1.4 cP or above at 25° C.

In the non-aqueous electrolytic solution used in the lithium secondary battery of the present invention, the lithium salt to be dissolved in the non-aqueous solvent may use any one commonly used in the art for lithium secondary batteries. Representatively, the lithium salt may be $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiBOB(LiC_4BO_8)$ and so on. Besides, other compounds such as lactone, ether, ester, acetonitrile, lactam and ketone may be added thereto without deteriorating the purpose of the present invention.

The non-aqueous electrolytic solution in which lithium salt is dissolved may be injected at a suitable stage during the battery manufacturing process in accordance with manufacture processes and demanded properties of a final product. In other words, this injecting process may be executed before a battery is assembled or when a battery is finally assembled.

(c) Cathode and Anode

Electrodes (cathode and anode) applied together with the separator of the present invention are not specially limited, and they may be made by binding electrode active materials to an electrode current collector according to a common method well known in the art. Among the electrode active materials, a cathode active material may use any cathode active material commonly used in the art for existing lithium secondary batteries, and particularly lithium manganese oxide, lithium cobalt oxide, lithium nickel oxide, lithium iron oxide, or lithium composite oxides where the above oxides are combined are preferred. An anode active material may use any anode active material commonly available for an anode of existing lithium secondary batteries, not limitedly, and particularly lithium metal or lithium alloys, carbon, petroleum coke, activated carbon, graphite or lithium adsorption material such as other carbonaceous substances are preferred. The cathode current collector may be a foil made of aluminum, nickel or their combination, not limitedly, and the anode current collector may be a foil made of copper, gold, nickel or copper alloys or their combinations.

MODE FOR INVENTION

Hereinafter, the present invention is explained in more detail using embodiments. However, the following embodiments may be modified in various ways, and the present invention should not be interpreted as being limited thereto. The following embodiments are just given for persons having ordinary skill in the art to understand the present invention in a better way.

EXAMPLE 1

Preparation of Separator 5 parts by weight of polyvinylidenefluoride-hexafluoropropylene copolymer and 5 parts by weight of cyanoethylpolyvinylalcohol were respectively added to acetone and dissolved at 50° C. for about 12 hours or more to prepare a binder polymer solution. The prepared polymer solution was added with $Al_2O_3$ powder so that a weight ratio of polymer mixture/$Al_2O_3$=10/90, and then $Al_2O_3$ powder was pulverized for 12 hours or more into an average diameter of 400 nm by means of ball milling and then dispersed to prepare slurry. The slurry prepared as above was applied to a polyethylene/polypropylene lamination film with a thickness of 16 μm by means of dip coating, and a coating thickness was controlled to be about 4 μm based on one surface of the film. Pore size in the porous coating layer formed on the film was about 0.5 μm, and porosity was 58%.

Preparation of Cell

The separator prepared as above was interposed between a cathode in which $LiCoO_2$ and $Li(Ni_{0.53}Co_{0.20}Mn_{0.27})O_2$ were mixed at a ratio of 2:1 and an anode that is made of artificial graphite, then a non-aqueous electrolytic solution obtained by dissolving 1.0M of $LiPF_6$ into fluoroethylene carbonate (with a viscosity of 4.1 cP at 25° C.) was injected thereto. After that, a coin cell was made in a general way.

EXAMPLE 2

A coin cell was made in the same way as the example 1, except that polyethyleneterephthalate non-woven fabric with a thickness of 12 μm was used instead of the polyethylene/polypropylene lamination film of the example 1 to form a porous coating layer of the separator. The non-woven fabric used herein was made of super fine yarns with an average thickness of about 3 μm, and pores with a longitudinal diameter of less than 70 μm were in excess of 50%.

EXAMPLE 3

A coin cell was made in the same way as the example 1, except that a non-aqueous electrolytic solution obtained by dissolving 1.5M of $LiBF_4$ into a mixed solvent in which ethylene carbonate and γ-butyrolactone were mixed at a ratio of 2:3 (v/v, with a viscosity of 2.0 cP at 25° C.) was used instead of the non-aqueous electrolytic solution of the example 1.

EXAMPLE 4

A coin cell was made in the same way as the example 2, except that a non-aqueous electrolytic solution obtained by dissolving 1.5M of LiBF$_4$ into a mixed solvent in which ethylene carbonate and γ-butyrolactone were mixed at a ratio of 2:3 (v/v) was used instead of the non-aqueous electrolytic solution of the example 2.

EXAMPLE 5

A coin cell was made in the same way as the example 1, except that a non-aqueous electrolytic solution obtained by dissolving 1.5M of LiBF$_4$ into a mixed solvent in which ethylene carbonate, γ-butyrolactone and dimethyl carbonate were mixed at a ratio of 2:3:2 (v/v, with a viscosity of 1.44 cP at 25° C.) was used instead of the non-aqueous electrolytic solution of the example 1.

EXAMPLE 6

A coin cell was made in the same way as the example 2, except that a non-aqueous electrolytic solution obtained by dissolving 1.5M of LiBF$_4$ into a mixed solvent in which ethylene carbonate, γ-butyrolactone and dimethyl carbonate were mixed at a ratio of 2:3:2 (v/v) was used instead of the non-aqueous electrolytic solution of the example 2.

EXAMPLE 7

A coin cell was made in the same way as the example 1, except that a non-aqueous electrolytic solution obtained by dissolving 0.8M of LiTFSI into imidazole-trifluoromethane-sulfonylamide (EMIm-TFSI, with a viscosity of 45.9 cP at 25° C.) was used instead of the non-aqueous electrolytic solution of the example 1.

EXAMPLE 8

A coin cell was made in the same way as the example 7, except that polyethyleneterephthalate non-woven fabric with a thickness of 12 μm was used instead of the polyethylene/polypropylene lamination film of the example 7 to form a porous coating layer of the separator. The non-woven fabric used herein was made of super fine yarns with an average thickness of about 3 μm, and pores with a longitudinal diameter of less than 70 μm were in excess of 50%.

EXAMPLE 9

A coin cell was made in the same way as the example 7, except that a mixed solvent in which ethylmethyl imidazole-trifluoromethanesulfonylamide and dimethylcarbonate were mixed at a ratio of 4:6 (v/v, with a viscosity of 1.94 cP at 25° C.) was used instead of the non-aqueous electrolytic solution of the example 7.

EXAMPLE 10

A coin cell was made in the same way as the example 8, except that a mixed solvent in which ethylmethyl imidazole-trifluoromethanesulfonylamide and dimethylcarbonate were mixed at a ratio of 4:6 (v/v, with a viscosity of 1.94 cP at 25° C.) was used instead of the non-aqueous electrolytic solution of the example 8.

EXAMPLE 11

95 weight % of LiCoO$_2$ serving as a cathode active material, 2.5 weight % of Super-P serving as a conducting agent and 2.5 weight % of PVdF serving as a binder were added with NMP (N-methyl-2-pyrrolidone) to make a cathode active material slurry, and the slurry was applied to one side of an aluminum foil and then dried and compressed to make a cathode.

95 weight % of artificial graphite serving as an anode active material, 2.5 weight % of Super-P serving as a conducting agent and 2.5 weight % of PVdF serving as a binder were added with NMP (N-methyl-2-pyrrolidone) to make an anode active material slurry, and the slurry was applied to one side of a copper foil and then dried and compressed to make an anode.

A separator purchased from Celgard was interposed between the above cathode and anode to make an electrode assembly, and then a non-aqueous electrolytic solution obtained by dissolving 1.5M of LiBF$_4$ into a mixed solvent in which ethylene carbonate and γ-butyrolactone were mixed at a ratio of 2:3 (v/v, with a viscosity of 2.0 cP at 25° C.) was injected therein. After that, a cylindrical lithium secondary battery was made in a general manner.

COMPARATIVE EXAMPLE 1

A coin cell was made in the same way as the example 1, except that during the separator preparing process of the example 1, a polyethylene/polypropylene lamination film on which a porous coating layer is not formed was used as the separator.

COMPARATIVE EXAMPLE 2

A coin cell was made in the same way as the example 3, except that during the separator preparing process of the example 1, a polyethylene/polypropylene lamination film on which a porous coating layer is not formed was used as the separator.

COMPARATIVE EXAMPLE 3

A coin cell was made in the same way as the example 5, except that during the separator preparing process of the example 1, a polyethylene/polypropylene lamination film on which a porous coating layer is not formed was used as the separator.

COMPARATIVE EXAMPLE 4

A coin cell was made in the same way as the example 7, except that during the separator preparing process of the example 7, a polyethylene/polypropylene lamination film on which a porous coating layer is not formed was used as the separator.

COMPARATIVE EXAMPLE 5

A coin cell was made in the same way as the example 10, except that during the separator preparing process of the example 10, a polyethyleneterephthalate non-woven fabric on which a porous coating layer is not formed was used as the separator.

COMPARATIVE EXAMPLE 6

A coin cell was made in the same way as the example 11, except that a non-aqueous electrolytic solution obtained by dissolving 1.5M of LiBF$_4$ into a mixed solvent in which ethylene carbonate, γ-butyrolactone and dimethyl carbonate were mixed at a ratio of 2:3:3 (v/v, with a viscosity of 1.28 cP at 25° C.) was used instead of the non-aqueous electrolytic solution of the example 11.

Evaluation of Charging/Discharging Characteristics

Figure 2:
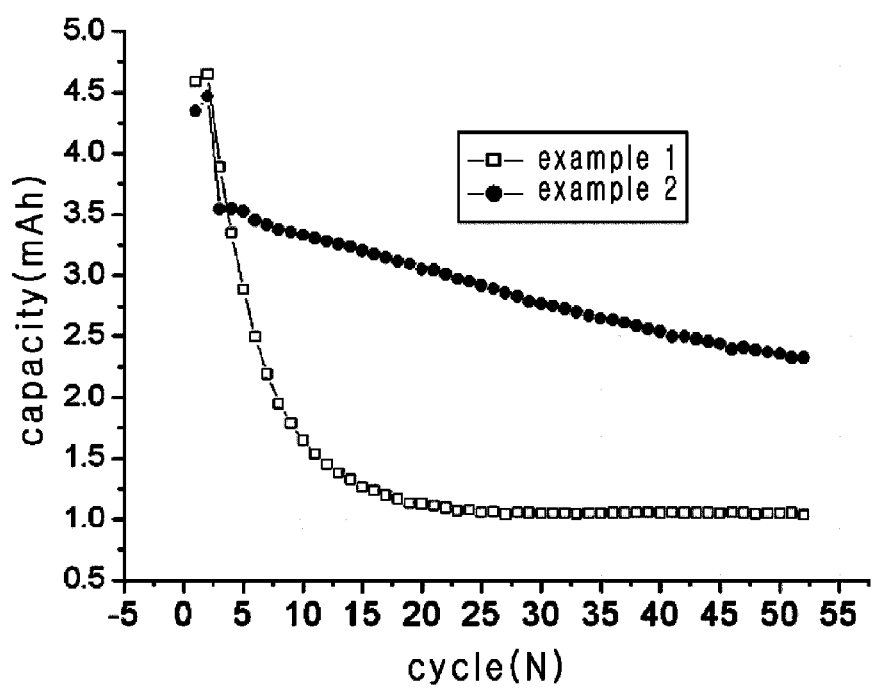
FIG. 2 is a graph showing charging/discharging results for coin cells according to examples 1 and 2, executed under the condition of 0.5 C cycle.

FIG. 1 is a graph showing charging/discharging results for the coin cell prepared according to the comparative example 1, and FIG. 2 is a graph showing charging/discharging results for the coin cells prepared according to the examples 1 and 2 under the condition of 0.5 C cycle.

Referring to the figures, it would be understood that the coin cell of the comparative example 1 using a high-viscous non-aqueous solvent and a separator without a porous coating layer could be not charged/discharged, but the coin cells of the examples 1 and 2 using a high-viscous non-aqueous solvent and a separator with a porous coating layer exhibit excellent charging/discharging performance. In particular, the coin cell of the example 2 using a polyethyleneterephthalate non-woven fabric as the porous substrate exhibits more excellent charging/discharging performance than the coin cell of the example 1 using a polyolefin-based porous film as the porous substrate. This result is judged as being caused by the kind of polymer of the non-woven fabric and the porosity of the non-woven fabric.

Figure 3:
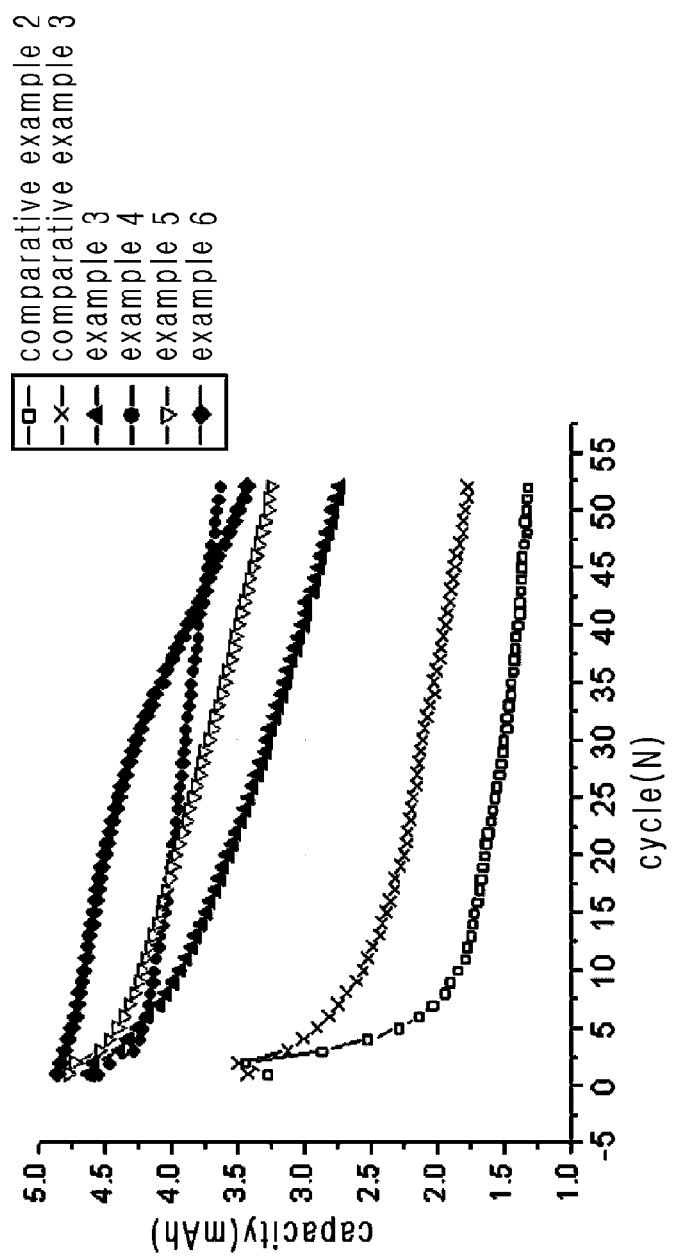
FIG. 3 is a graph showing charging/discharging results for coin cells according to examples 3 to 6 and comparative examples 2 to 3.

FIG. 3 is a graph showing charging/discharging results for the coin cells prepared according to the examples 3 to 6 and the comparative examples 2 to 3. Referring to the figures, it would be understood that the coin cells of the comparative examples 2 and 3 using a separator without a porous coating layer together with a high-viscous non-aqueous solvent exhibit very bad charging/discharging performance, but the coin cells of the examples 3 to 6 using a separator having a porous coating layer together with a high-viscous non-aqueous solvent exhibit excellent charging/discharging performance. Here, the coin cells of the examples 4 and 6 using a polyethyleneterephthalate non-woven fabric as the porous substrate exhibit more excellent charging/discharging performance than the coin cells of the examples 3 and 5 using a polyolefin-based porous film as the porous substrate.

Figure 4:
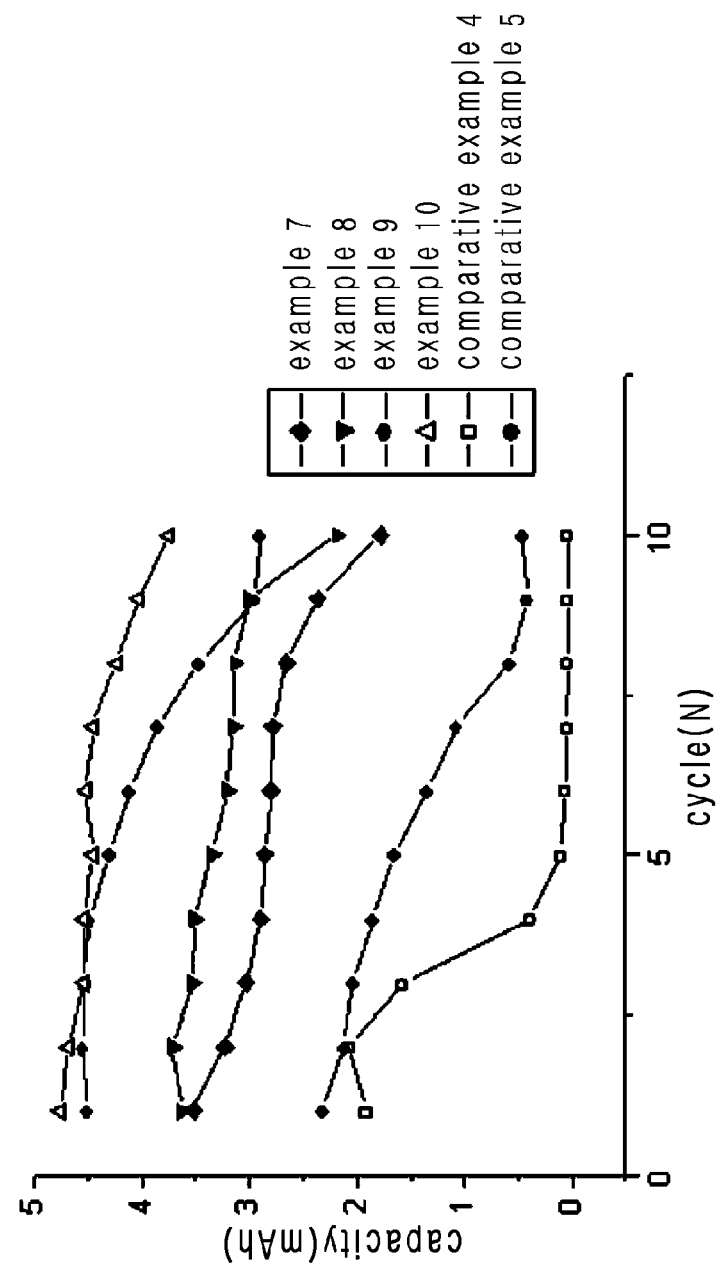
FIG. 4 is a graph showing charging/discharging results for coin cells according to comparative examples 4 to 5 and examples 7 to 10.

Meanwhile, FIG. 4 is a graph showing charging/discharging results under the cycle of 0.2 C for the coin cells according to the examples 7 to 10 and the comparative examples 4 to 5. Referring to the figure, it would be understood that the coin cell of the comparative example 4 using a separator without a porous coating layer and using an ionic liquid as a non-aqueous solvent exhibits very bad charging/discharging performance, but the coin cell of the example 7 using an ionic liquid together with a separator having the porous coating layer of the present invention exhibits excellent charging/discharging performance.

Also, it could be found that the coin cells of the examples 9 to 10 using a mixed solvent of ionic liquid and carbonate exhibit more excellent performance than the coin cells of the comparative examples 4 to 5 using an ionic liquid solely or an ionic liquid and a carbonate solvent in mixture together with a separator having no porous coating layer.

Evaluation of Overcharging Characteristics 10 cylindrical lithium second batteries were prepared in accordance with the example 11 and the comparative example 6, respectively, and each battery was charged to 4.2V. The charged batteries were overcharged up to 10V with a constant current of 2 A. Subsequently, as a constant voltage of 18.5V was maintained for 6 hours, the batteries were observed whether firing or explosion occurs. The observation results are in the following table 1.

TABLE 1

|  | Example 11 | Comparative example 6 |
|---|---|---|
| Number of Fired or exploded batteries | 0 | 3 |
| Number of not-fired or not-exploded batteries | 10 | 7 |
| Point of CID malfunction | >100 days | <15 days |

Seeing the table 1, it would be understood that the lithium secondary battery of the example 11 using the high-viscous non-aqueous solvent according to the present invention exhibits excellent stability with respect to overcharging rather than the lithium secondary battery of the comparative example 6, and also the lithium secondary battery of the example 11 generates less gas under a high-temperature environment, which prevents CID malfunction.

What is claimed is:

1. A lithium secondary battery, which includes a cathode, an anode, a separator interposed between the cathode and the anode, and a non-aqueous electrolytic solution obtained by dissolving lithium salt to a non-aqueous solvent, wherein the separator includes:
   a porous substrate having pores; and
   a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles,
   wherein the non-aqueous solvent is a high-viscous non-aqueous solvent having, a viscosity of 1.4 cP or above at 25° C,
   wherein the hinder polymer has a solubility parameter of 15 to 45 MPa$^{1/2}$,
   wherein a weight ratio of the inorganic particles and the binder polymer in the porous coating layer is 50:50 to 99:1,
   wherein the porous substrate has a thickness of 1 to 100 μm, and the porous coating layer has a thickness of 0.01 to 20 μm, and
   wherein the high-viscous non-aqueous solvent includes γ-butyrolactone, fluoroethylene carbonate and their mixtures.

2. The lithium secondary battery according to claim 1, wherein the non-aqueous solvent is a high-viscous non-aqueous solvent having a viscosity of 4.1 cP or above at 25° C.

3. The lithium secondary battery according to claim 1, wherein the porous substrate is a polyolefin-based porous film.

4. The lithium secondary battery according to claim 3, wherein the polyolefin-based porous film is any one polymer selected from the group consisting of polyethylene, polypropylene, polybutylene, polypentene and their mixtures.

5. The lithium secondary battery according to claim 1, wherein the porous substrate is a non-woven fabric made of any one polymer selected from the group consisting of polyester, polyacetal, polyamide, polycarbonate, polyimide, polyetheretherketone, polyethersulfone, polyphenylene oxide, polyphenylene sulfide, polyethylene naphthalene and their mixtures.

6. The lithium secondary battery according to claim 1, wherein the inorganic particles have an average diameter of 0.001 to 10 μm.

7. The lithium secondary battery according to claim 1, wherein the inorganic particles are selected from the group consisting of inorganic particles having a dielectric constant of 5 or above, inorganic particles having lithium ion transferring capability and their mixtures.

8. The lithium secondary battery according to claim 7, wherein the inorganic particles having a dielectric constant of 5 or above are any one kind of inorganic particles selected from the group consisting of $BaTiO_3$, $Pb(Zr,Ti)O_3$ (PZT), $(Pb_{1-x}La_xZr_{1-y}Ti_yO_3$(PLZT, here $0<x<1, 0<y<1$), $Pb(Mg_{1/3}Nb_{2/3}))O_3$-$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and their mixtures.

9. The lithium secondary battery according to claim 7, wherein the inorganic particles having lithium ion transferring capability are any one kind of inorganic particles selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_{z(PO4)_3}$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<X<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$) and their mixtures.

10. The lithium secondary battery according to claim 1, wherein the binder polymer is any one binder polymer selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and their mixtures.

11. The lithium secondary battery according to claim 1, wherein the high-viscous non-aqueous solvent includes fluoroethylene carbonate.

12. The lithium secondary battery according to claim 1, wherein the high-viscous non-aqueous solvent includes ionic liquid.

13. The lithium secondary battery according to claim 12, wherein the ionic liquid includes any one ionic liquid selected from the group consisting of imidazole-based ionic liquid, ammonium-based ionic liquid, pyrolidium-based ionic liquid, pyridinium-based ionic liquid, phosponium-based ionic liquid and their mixtures.

14. The lithium secondary battery according to claim 1, wherein the porous substrate is a non-woven fabric made of polyethyleneterephthalate.

* * * * *